Patented May 4, 1926.

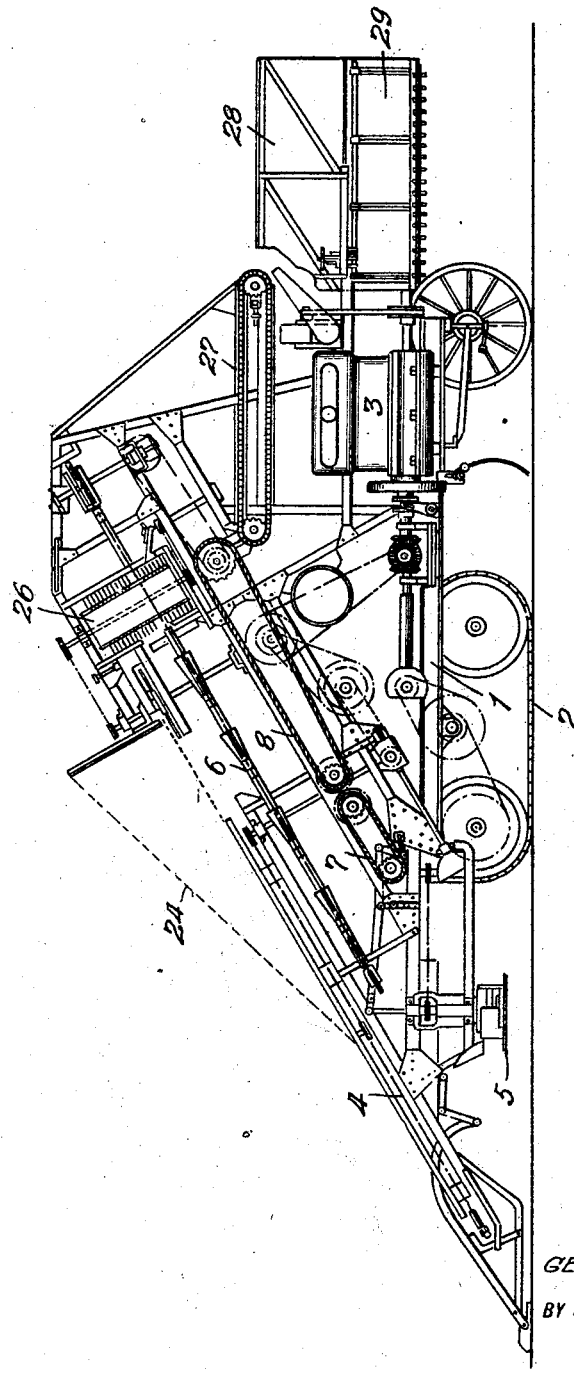

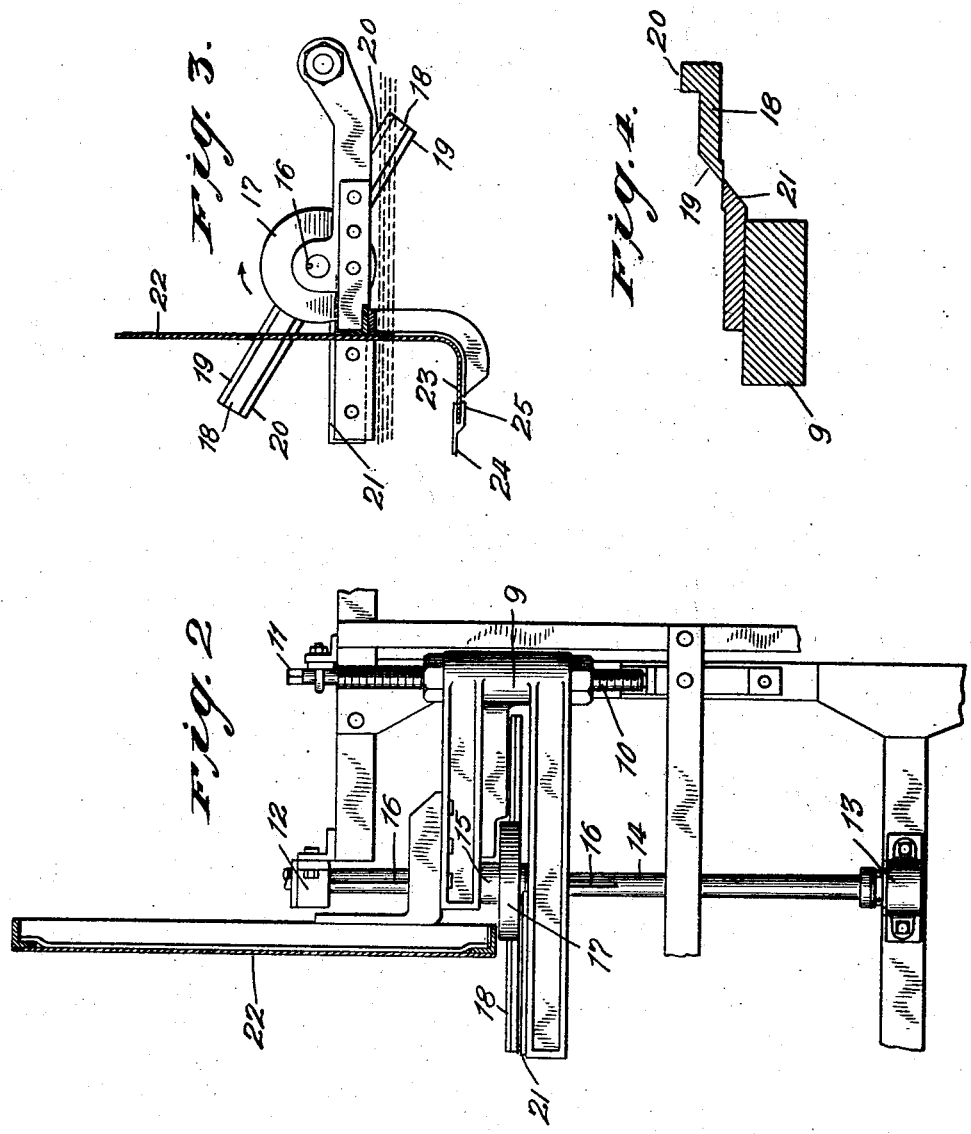

1,583,478

UNITED STATES PATENT OFFICE.

GEORGE D. LUCE, OF HAMMOND, LOUISIANA, ASSIGNOR TO LUCE CANE HARVESTER CORPORATION, OF NEW YORK, N. Y., A CORPORATION OF DELAWARE.

TOPPING DEVICE FOR CANE HARVESTERS AND THE LIKE.

Original application filed May 12, 1919, Serial No. 296,539. Divided and this application filed June 8, 1922. Serial No. 566,730.

*To all whom it may concern:*

Be it known that I, GEORGE D. LUCE, a citizen of the United States, residing in Hammond, parish of Tangipahoa, and State of Louisiana, have invented certain new and useful Improvements in Topping Devices for Cane Harvesters and the like, of which the following is a specification.

This invention relates to improvements in cane harvesters and the like, and particularly to the means for cutting off the green tops of the cane.

In harvesting cane and preparing the same for the mill, it is necessary to cut off the green tops of the cane and this invention has for its object to provide means for topping the cane in an efficient manner. More specifically the invention includes cutting knives by means of which the topping of the cane is effected by a shearing action, and which may be adjusted to act upon cane of different lengths. The invention also includes means for bending the green tops of the cane with respect to the ripe portion thereof in such a manner that the cane will be cut at the bent point, and means for properly presenting the cane to the bending and cutting means.

Other objects of the invention are to provide a cane topping means which is simple in its construction positive in its operation, and which, in use, will throw the severed tops of the cane to one side of the machine.

For the purpose of illustrating the invention I have shown it as applied to a harvester of the form disclosed in my co-pending application, Serial No. 296,539, filed May 12, 1919, of which the present application is a division.

In the accompanying drawings forming part of this application, and in which I have shown one preferred embodiment of my invention as illustrative of the principle thereof and the best mode now known to me for performing the same, Figure 1 is a view, partly in side elevation and partly in longitudinal section and somewhat diagrammatic in character, showing a harvester of the type referred to, having the preferred form of the invention applied thereto;

Figure 2 is a side view of the topping devices; the topping fender being shown in vertical section; Figure 3 is a plan view of the topping devices; Figure 4 is a detail view in transverse section of the fixed and revolving topping knives, showing the shear action thereof.

Referring to the drawings, the harvester has a frame 1 mounted on the caterpillar tractor treads 2, and is provided with a motor 3 for propelling the apparatus and driving the various mechanisms thereof. At the front of the machine are pick-up chains 4 which gather in the cane and hold it while it is cut close to or below the level of the ground by the rotary disc cutters 5, which in Figure 1 are shown raised to their inoperative positions. When the cane has been severed, it is seized by conveyor chains 6 and conveyed upwardly and rearwardly through the machine. As the cane is thus conveyed, the butts engage the forward end of a traveling belt or chain 7 which tilts the cane into a rearwardly inclined position, and the cane is supported in this position by the engagement of the butts with the chain 7 and the elevator belt or chain 8. The parts of the machine thus far described are more fully described in my application above referred to.

While the cane is being carried upwardly and rearwardly through the machine, the green tops are cut off by the topping means which will now be described. The topping knife frame 9 is preferably constructed as shown most clearly in Figures 2 and 3, this frame being of a sort of yoke shape having two arms connected to a body or base at one end and being suitably mounted to have an up and down adjustment. As illustrated, the frame 9 is mounted on a rotatable screw threaded shaft 10 attached to members of the main frame of the machine and which is provided with a squared upper end 11 which may be engaged by a wrench so that the screw shaft may be turned to adjust the frame up or down. Journalled in bearings 12 and 13 on the main frame is the topping knife shaft 14 which is rapidly rotated by power from the motor of the machine. This shaft passes through a bearing 15 on the topping knife frame, and is provided with a spline 16. The topping knife hub 17 is mounted between the arms of the topping knife frame and has a feather fitting in the spline 16, so that it is positively rotated with the shaft 14 but is longitudinally slidable thereon and is capable of vertical adjustment with the frame 9. The hub 17 carries the revolving topping knife blades 18 which are preferably of a cross section such as shown in Figure 4, each blade being sharpened at one edge 19 and having a raised rib 20 along the back. Mounted on the lower arm of the frame 9, is a fixed blade 21 adapted to cooperate with the revolving blades 18 so that the latter will cut the cane with a shear action. The topping knife is revolved rapidly in the direction of the arrow in Figure 3, and engages the cane as it is carried up by the conveyor chains and severs the green tops. The ribs 20 strike the tops as they are severed and throw them clear of the machine so as to effectually prevent the tops from falling down into the conveyor chains and possibly tending to clog the machine. This is an important function and is very effectually performed by providing ribs or raised members along the backs of the revolving knife blades. The frame 9 preferably carries a topping fender 22 which is adjustable up and down with the frame and topping knife and which is struck by the tops of the canes as the latter are carried up by the conveyor chains. This fender serves to bend over the green tops so that the cane will be topped as near as possible at the point where it is bent, this point constituting the line of demarkation between the ripe cane which is comparatively stiff and the green top which is flexible. The topping fender preferably extends substantially at right angles to the plane of revolution of the topping knife and to the conveyor chains, and transversely across the machine, as shown in Figure 3, and has a flange 23 extending forwardly a short distance at one side. As shown in Figures 1 and 3 a vertical shield 24 may be mounted at one side of the path of travel of the cane up through the machine, and may be connected at its upper edge by a sliding joint 25 with the flange 23. This shield, when used holds the cane away from the side of the machine where the operator stands and prevents any tops from being thrown out in that direction. The revolving knife, owing to the projection on the back tends to throw the tops towards the opposite side of the machine and, if desired, a chute may be provided to receive the tops and carry them out of the way towards the back of the machine.

After the cane has been topped it is stripped by the strippers 26, and is then dropped upon a traveling apron 27 which deposits it within a hopper 28, from which it is discharged in any suitable manner as by opening the door 29 of the hopper at will.

While I have illustrated and described in detail one preferred embodiment of my invention, it is to be understood that I do not wish to be limited to the precise construction shown and described, but that I intend to cover my invention broadly in whatever form its principles may be employed. It is also to be understood that the invention may be used with other forms of apparatus than the particular harvester construction shown.

What I claim is:

1. In a machine of the character described, conveying means for conveying the cane, a topping fender arranged transversely of the direction of movement of said conveying means and adapted to bend over the cane tops, and a revolving topping knife blade having a raised rib along the back thereof arranged adjacent said fender and adapted to sever the bent cane tops and throw them clear of the machine.

2. In a machine of the character described, a yoke shaped frame, means for adjustably supporting said frame for up and down movement, a stationary cutter carried by said frame and a rotary cutter mounted between the arms of the frame and adapted to cooperate with the stationary cutter to sever the cane tops with a shear action.

3. In a machine of the character described, a frame, means for adjustably supporting said frame for up and down movement, a rotary cutter carried by the frame and a topping fender carried by the frame and adapted to bend over the cane tops prior to their severance.

4. In a machine of the character described, a revolving topping cutter revoluble in a plane transverse to the stalks to be cut and a topping fender mounted adjacent thereto in a position substantially parallel to the axis of rotation of the cutter.

5. In a machine of the character described, conveying means for conveying the cane, a topping cutter rotatable in a plane parallel to that of the movement of the conveying means and a topping fender arranged transversely of said plane adjacent to the cutter and adapted to bend over the cane tops prior to their severance.

6. In a machine of the character described, the combination of conveyor chains extending upwardly and rearwardly for conveying the cane in a standing position through the machine, a topping cutter mounted above the plane of the conveyor chains to rotate about an axis substantially vertical to said plane, and a topping fender located adjacent said cutter and at an angle to the plane of rotation thereof and adapted to bend over the cane tops prior to their severance.

7. In a machine of the character described, rearwardly and upwardly inclined conveyor chains for conveying the cane through the machine in a standing position, a frame above said chains, and means for adjustably supporting said frame for movement towards and from said chains, a topping cutter carried by said frame and mounted to rotate about an axis substantially perpendicular to the plane of the chains, and a topping fender carried by said frame and arranged substantially perpendicular to the plane of the chains and extending transversely above the line of travel of the conveying runs of the chains.

8. In a machine of the character described, a screw threaded shaft, a yoke shaped topping knife frame carried thereby, a rotatable shaft and a rotary topping knife splined on said shaft and mounted between the arms of said frame.

9. In a machine of the character described, a screw threaded shaft, a yoke shaped topping knife frame carried thereby, a rotatable shaft, a rotary topping knife splined on said shaft and mounted between the arms of said frame, and a topping fender carried by said frame and adapted to bend over the cane tops prior to their severance.

10. In a machine of the character described, the combination of rearwardly and upwardly inclined conveyor chains for conveying the cane through the machine, a revolving topping knife located above the conveyor chains, a topping fender extending upwardly and forwardly above the knife and transversely across the direction of travel of the cane, and a shield extending forwardly from one side of the fender above the conveyor chains and at one side of the path of travel of the cane.

In testimony whereof I have affixed my signature to this specification.

GEORGE D. LUCE.